(12) United States Patent
Humburg

(10) Patent No.: US 9,506,477 B2
(45) Date of Patent: Nov. 29, 2016

(54) BLOWER, ESPECIALLY COMBUSTION AIR BLOWER FOR A VEHICLE HEATER

(71) Applicant: Eberspächer Climate Control Systems GmbH & Co. KG, Esslingen (DE)

(72) Inventor: Michael Humburg, Göppingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 361 days.

(21) Appl. No.: 13/955,397

(22) Filed: Jul. 31, 2013

(65) Prior Publication Data

US 2014/0037469 A1 Feb. 6, 2014

(30) Foreign Application Priority Data

Aug. 1, 2012 (DE) .................. 10 2012 213 598

(51) Int. Cl.
*F04D 29/66* (2006.01)
*B60H 1/00* (2006.01)

(52) U.S. Cl.
CPC ......... *F04D 29/664* (2013.01); *B60H 1/00028* (2013.01); *B60H 1/00521* (2013.01); *F04D 29/663* (2013.01); *B60H 2001/006* (2013.01)

(58) Field of Classification Search
CPC .. F04D 29/663; F04D 29/664; F04D 29/668; F24F 2013/242; B60H 2001/006; B60H 1/00521; B60H 1/00028
See application file for complete search history.

(56) References Cited

U.S. PATENT DOCUMENTS

| | | | | |
|---|---|---|---|---|
| 2,316,542 | A | * | 4/1943 | Aldrich ............... F04D 29/4226 219/137 R |
| 3,360,193 | A | | 12/1967 | Harris et al. |
| 3,761,203 | A | * | 9/1973 | Neidhardt ............. F04D 23/008 415/119 |
| 4,688,718 | A | * | 8/1987 | Galtz ................... B60H 1/2212 126/110 B |
| 4,950,133 | A | * | 8/1990 | Sargent ................. F04D 29/664 4/541.5 |
| 2002/0066619 | A1 | | 6/2002 | Collmer et al. |
| 2012/0241529 | A1 | | 9/2012 | Wetzl et al. |

FOREIGN PATENT DOCUMENTS

| | | | | |
|---|---|---|---|---|
| CN | 102410255 A | | 4/2012 | |
| DE | 41 00 523 C2 | | 1/1992 | |
| DE | 100 60 522 A1 | | 6/2002 | |
| DE | 10060522 A1 | * | 6/2002 | ............... F01N 1/06 |
| DE | 20 2004 015 442 U1 | | 2/2006 | |
| DE | 10 2007 040 461 A1 | | 3/2009 | |
| DE | 10 2010 023 462 A1 | | 12/2011 | |
| GB | 2 242 482 A | | 2/1991 | |
| WO | 2009/030391 A1 | | 3/2009 | |
| WO | 2011/154092 A1 | | 12/2011 | |

* cited by examiner

*Primary Examiner* — Charles Freay
*Assistant Examiner* — Thomas Cash
(74) *Attorney, Agent, or Firm* — McGlew and Tuttle, P.C.

(57) ABSTRACT

A blower, especially combustion air blower for a vehicle heater, includes a blower housing (10) with a housing bottom (14) and with a circumferential wall (16) adjoining the housing bottom (14) and defining a housing interior space (20). A partition (18) divides the housing interior space (20) into a motor mounting space (22) and a sound insulation space (24).

20 Claims, 3 Drawing Sheets

BLOWER, ESPECIALLY COMBUSTION AIR BLOWER FOR A VEHICLE HEATER

CROSS REFERENCE TO RELATED APPLICATIONS

This application claims the benefit of priority under 35 U.S.C. §119 of German Patent Application DE 10 2012 213 598.7 filed Aug. 1, 2012, the entire contents of which are incorporated herein by reference.

FIELD OF THE INVENTION

The present invention pertains to a blower, which can be used, for example, as a combustion air blower in a vehicle heater, e.g., a parking heater or auxiliary heater.

BACKGROUND OF THE INVENTION

Such blowers used in vehicle heaters are designed, for example, as so-called side channel blowers, in which a ring-shaped feed channel is covered by a feed wheel. The feed wheel has a plurality of feed wheel blades, which follow each other in the circumferential direction and which generate an air circulation along the ring-shaped feed channel during rotation of the feed wheel. The ring-shaped feed channel is interrupted in an interrupter area. If the feed wheel blades sweep the interrupter area, noise is generated, whose frequency is determined essentially by the speed of rotation of the feed wheel and the number of feed wheel blades provided in the feed wheel. This frequency is in the range of about 3,000 Hz during normal combustion air feed operation. This is an especially easily perceptible frequency range for human hearing.

SUMMARY OF THE INVENTION

An object of the present invention is to provide a blower, especially combustion air blower, for a vehicle heater, in which provisions are made for an efficient reduction of the noise occurring during the feed operation.

This object is accomplished according to the present invention by a blower, especially combustion air blower, for a vehicle heater, comprising a blower housing with a housing bottom and with a circumferential wall, which adjoins the housing bottom and encloses a housing interior space, and a partition, which divides the housing interior space into a motor mounting space and a sound insulation space and adjoins the housing bottom preferably in an end area facing the housing bottom.

Not only does the blower housing accommodate a motor for driving a feed wheel in the blower designed according to the present invention, but a volume area, which can be optimized especially concerning the necessary sound insulation and the measures to be taken therefor, is made available due to the provision of the partition and the division of the housing interior space into the motor mounting space and the sound insulation space.

Provisions may be made, for example, for the circumferential wall and the partition to have essentially the same length of extension in the direction of a longitudinal axis of the housing. This means that the entire housing interior space is divided into the motor mounting space and the sound insulation space. A connection of these two spaces, which is brought about, for example, by the shorter design of the partition, is thus avoided.

To make possible a defined guiding of the air to be fed in the sound insulation space and, furthermore, to make it possible to take sound insulation measures suitable for noise reduction, it is proposed that an air flow tube extend from an end area of the sound insulation space facing away from the housing bottom into the sound insulation space. Furthermore, provisions may advantageously be made for an end area of the air flow tube facing the housing bottom to be at a spaced location from the housing bottom. A volume, in which the air flow is limited essentially by the partition and the circumferential wall of the blower housing, is formed due to the distance between the air flow tube and the bottom area. This volume area can be used according to another advantageous aspect of the present invention to form a sound insulation chamber between an end area of the air flow tube facing the housing bottom and the housing bottom. Sound waves propagating in the air being fed can be reflected in the sound insulation chamber on the walls defining said sound insulation chamber, so that a substantial contribution of sound reflection to sound insulation can be utilized.

To make it possible to provide a contribution of absorption to sound insulation in the volume area of the sound insulation chamber in which the air flow tube also extends, it is proposed, furthermore, that sound insulation material surrounding the air flow tube be arranged in the sound insulation space. Especially if the above-mentioned sound insulation chamber is provided, the latter may also be defined in some areas by the sound insulation material, so that reflection and absorption complement each other in an especially advantageous manner.

The absorption aspect introduced by the sound insulation material can now be used especially efficiently if the sound insulation material fills out the entire volume between an outer surface of the air flow tube and surfaces of the circumferential wall facing the sound insulation space and of the partition, wherein an end area of the sound insulation material facing the housing bottom preferably is at a spaced location from the housing bottom.

To make it possible to utilize the above-mentioned aspect of sound insulation by reflection, in the area in which a flow transition from the air flow tube to the housing bottom takes place, even more efficient, it is proposed that an air outlet opening located opposite the housing bottom be provided in an end area of the air flow tube facing the housing bottom, that an air passage opening be provided, and that the air outlet opening and the air passage opening be located offset in relation to one another at least in some areas.

Furthermore, provisions may be made for providing a plurality of openings in a tube wall of the air flow tube.

It is proposed in an embodiment variant that can be embodied with a simple design that the housing bottom be formed integrally, preferably as a diecast metal body, with the circumferential wall and/or the partition. A blower motor carried on the housing bottom may be arranged in the motor mounting space, wherein a motor shaft of the blower motor passes through a shaft opening in the housing bottom and carries a feed wheel located opposite an outer side of the housing bottom, wherein a ring-shaped air feed channel covered by the feed wheel is arranged preferably on the outer side of the housing bottom. The ring-shaped air feed channel is advantageously integrated in this embodiment in the bottom area, i.e., it is provided as a recess on the outer side of the housing bottom, so that additional components for providing the air feed channel can be eliminated.

To prevent especially also the escape of motor noises, it is proposed, furthermore, that a closing element closing the motor mounting space and the sound insulation space be provided at an end area of the circumferential wall facing away from the housing bottom. Such a closing element, designed, for example, as a closing cover, can advantageously also carry the air flow tube.

The blower may, furthermore, be designed such that a motor actuating unit is arranged in the motor mounting space. Functions can be combined here as well and a simplified design can be obtained by the motor actuating unit being carried on the closing element.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
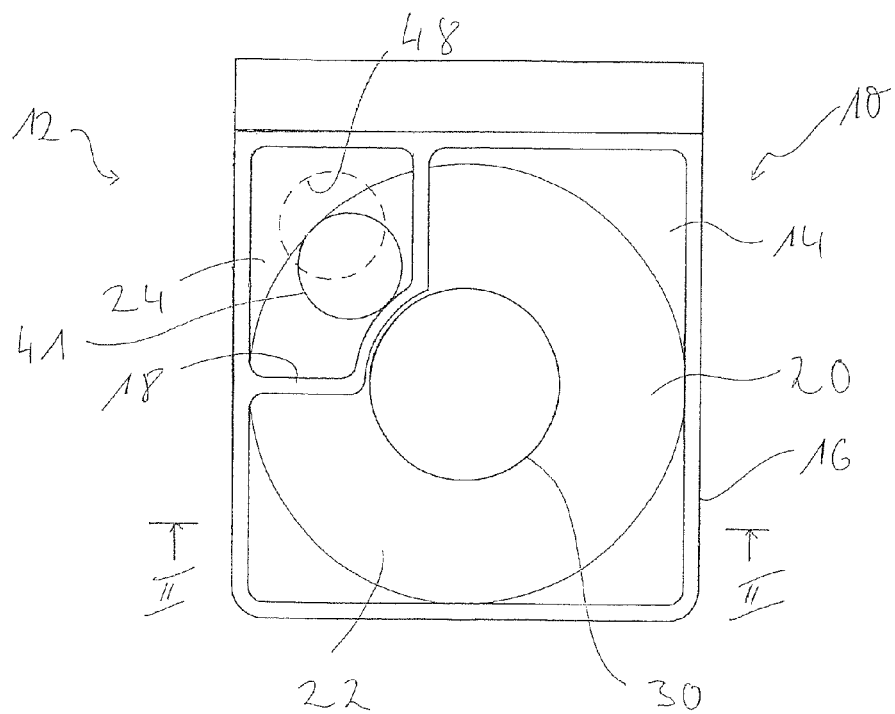
FIG. 1 is an axial view of a blower housing in direction of view I in FIG. 2.
Figure 2:
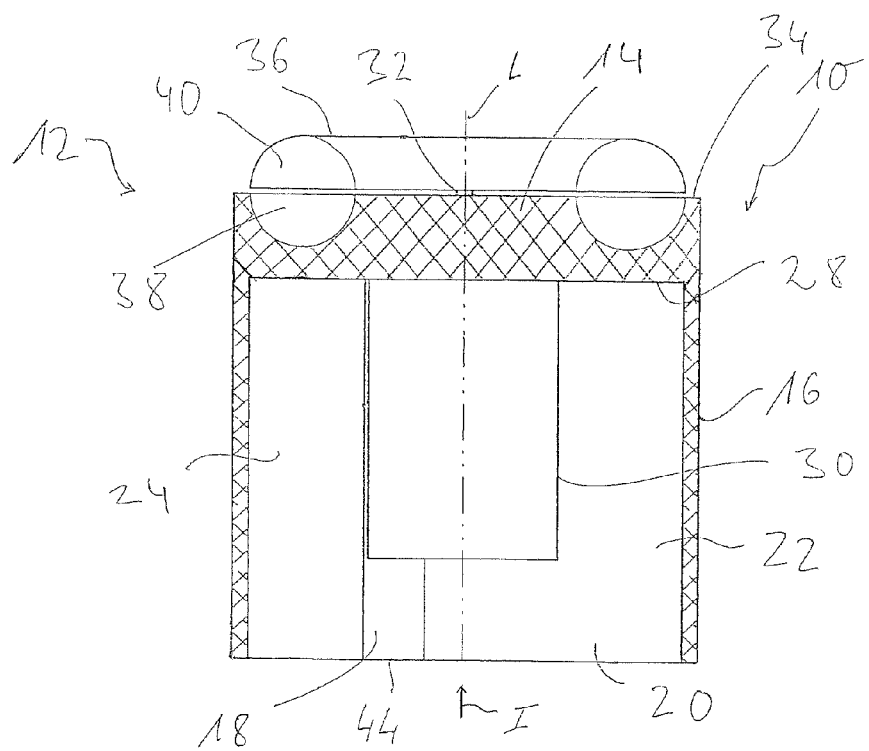
FIG. 2 is a side view of the blower housing according to FIG. 1, in a section along a line II-II in FIG. 1.
Figure 3:
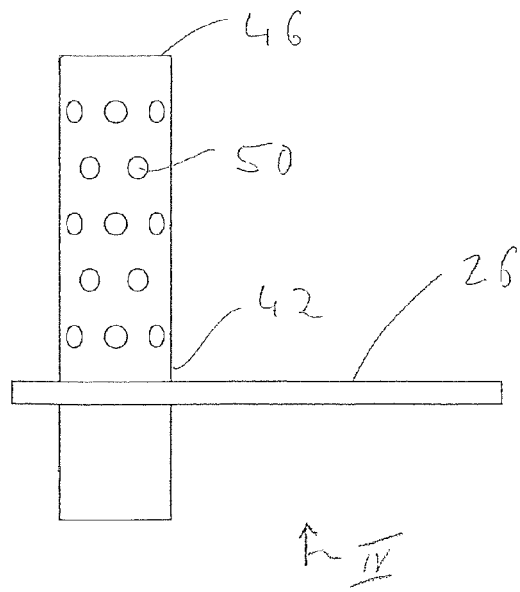
FIG. 3 is a side view of a closing element for the blower housing according to FIGS. 1 and 2.
Figure 4:
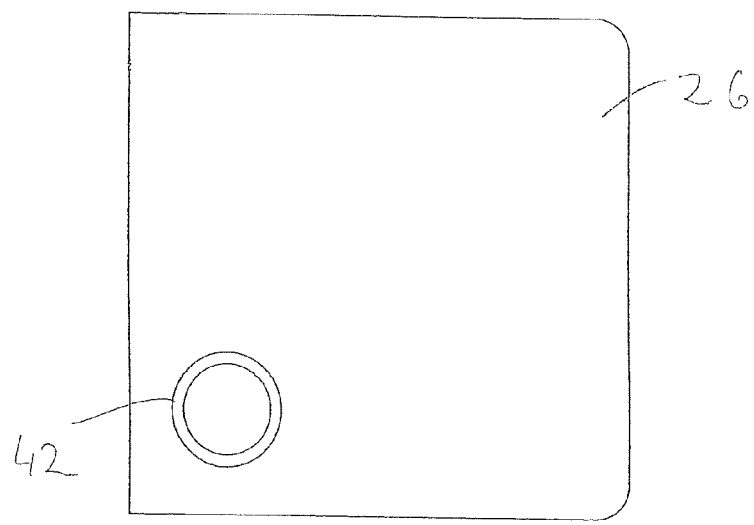
FIG. 4 is a view showing the closing element for the blower housing according to FIG. 1 in the direction of view IV.
Figure 5:
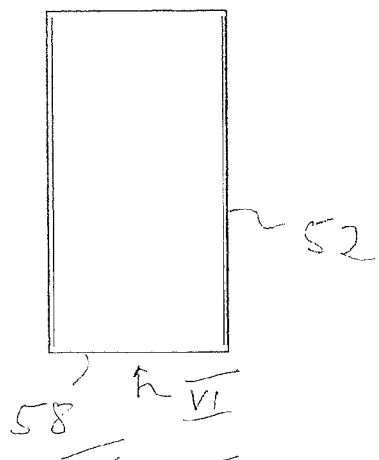
FIG. 5 is a side view of a sound insulation body made of sound insulation material for the blower housing according to FIGS. 1 and 2.
Figure 6:
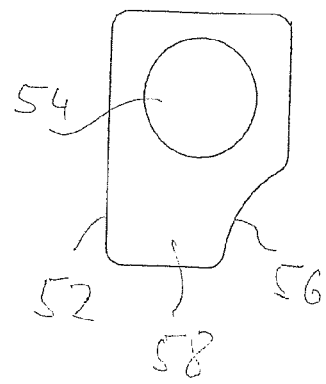
FIG. 6 is a view of the sound insulation body shown in FIG. 5 in direction of view VI in FIG. 5.
Figure 7:
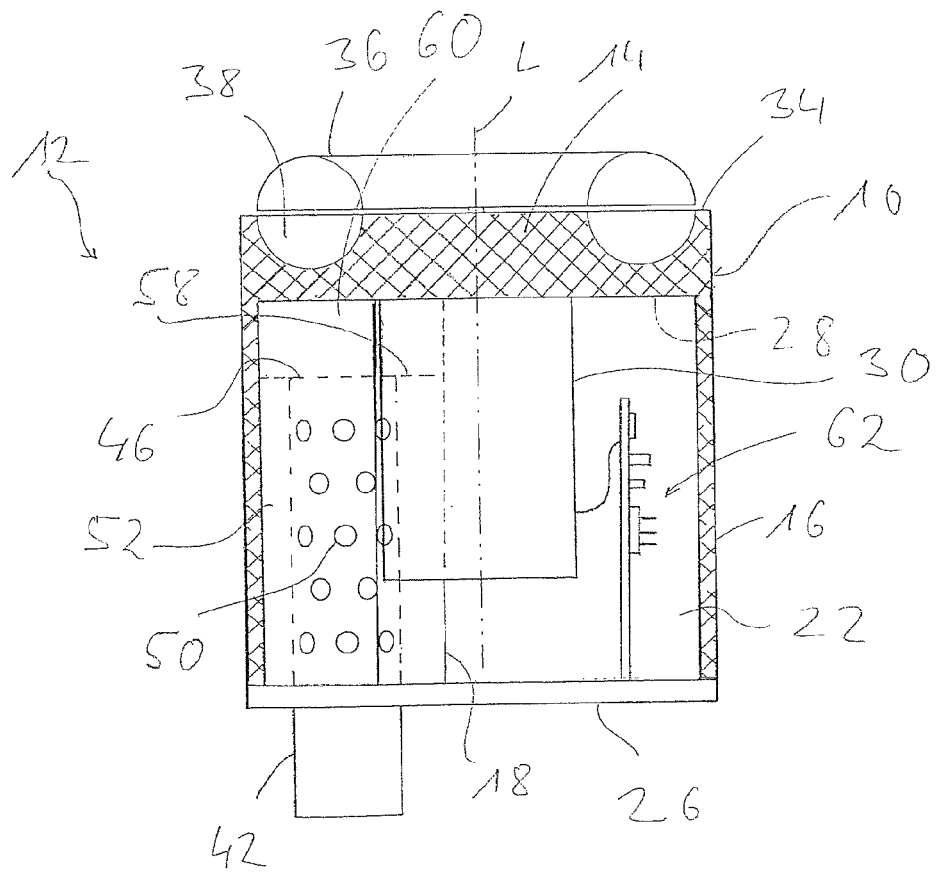
FIG. 7 is a view corresponding to FIG. 2 of the blower housing with closing element according to FIG. 3 arranged thereon.

Referring to the drawings in particular, FIGS. 1, 2 and 7 show a blower housing of a blower 12, which can be used to feed combustion air in a vehicle heater, which blower housing is generally designated by 10. Blower housing 10 comprises a housing bottom 14 and a circumferential wall 16 extending from this in the direction of a longitudinal axis L. Starting from the housing bottom 14, a partition 18 likewise extends in the direction of longitudinal axis L. Partition 18 divides the housing interior space 20 defined basically by the circumferential wall 16 into a motor mounting space 22 and a sound insulation space 24. Starting from the housing bottom 14, the circumferential wall 16 and the partition 18 have the same length of extension in the direction of the longitudinal axis L. A cover-like closing element 26, which will be described in even more detail below and can be recognized in FIGS. 3, 4 and 7, can close the housing interior space 20 and thus both the motor mounting space 22 and the sound insulation space 24 on the axial side facing away from the housing bottom 14 in the assembled state.

A blower motor 30 designed as an electric motor is provided on the inner side 28 of the housing bottom 14, which said inner side faces the housing interior space 20, and said blower motor 30 is carried permanently on the housing bottom 14, e.g., by means of screw connection. A motor shaft 32, passing through the housing bottom 14 in the area of a shaft opening (not shown in the figures), carries a feed wheel 36 on the outer side 34 facing away from the housing interior space 20.

A feed channel 38 having, for example, a semicircular cross section, which said feed channel extends in a ring-shaped pattern around the longitudinal axis L and may be interrupted by an interrupter in the circumferential direction at positions (not shown in the figures), is arranged in the housing bottom 14 on the outer side 34 or in such a way that it is open towards the outer side 34. In its radially outer area, the feed wheel 36 has a cross-sectional geometry complementary to the cross-sectional geometry of the feed channel 38 and carries a plurality of feed wheel blades 40 following each other in the circumferential direction. The air to be fed is drawn via air passage opening 41 provided in the housing bottom 14 during the rotation of the feed wheel 36 about the longitudinal axis L, which can consequently also correspond advantageously to the axis of rotation of the motor shaft 32, and is released there via an opening, which is not shown in the figure and leads away from the feed channel 38.

Since the air passage opening 41, formed in the housing bottom 14, is located in the area of the sound insulation space 24 separated by the partition 18 from the motor mounting space 22, the air to be fed by the feed wheel 36 is sent over the sound insulation space 24 into the feed channel 38. The sound insulation space 24 and the motor mounting space 22, are closed, on the axial end area facing away from the housing bottom 14, by the closing element 26. The closing element 26 has, for example, a cover-like design and is connected to the circumferential wall 16, possibly via the intermediary of a sealing element or the like, by screw connection, locking or the like. An air flow tube 42 is carried at the closing element 26 to make it possible for air to enter the sound insulation space 24. This air flow tube extends, starting from the end area 44 of the partition 18 and hence also of the sound insulation space 24, which said end area 44 faces away from the housing bottom 14, into said sound insulation space 24. The air flow tube 42 has a shorter axial length with its section extending into the sound insulation space 24 starting from the closing element 26 than the partition 18 or the circumferential wall 16, each starting from the housing bottom 14. This causes an end area 46 of the air flow tube 22, which said end area is located close to the housing bottom 14, as well as an air outlet opening 48 of the air flow tube 42, which said air outlet opening 48 is located opposite and faces the housing bottom 14, to be located at an axially spaced location from the inner side 28 of the housing bottom and thus also from the air outlet opening 41 formed therein.

In a longitudinal section, extending in the sound insulation space 24, the air flow tube 42 has a perforation or a plurality of openings 50. Furthermore, a sound insulation body 52 made of a sound insulation material, for example, open-cell foam material, is arranged in the sound insulation space 24, surrounding the section of the air flow tube 42 extending therein. This sound insulation body has an opening 54 adapted to the outer circumferential contour and outer circumferential dimension of the air flow tube 42, so that the sound insulation body 52 surrounds the air flow tube 42 essentially without gaps and is directly in contact with the outer side thereof. The outer circumferential contour and external dimension of the sound insulation body 52 are correspondingly adapted to the contour and the dimension of the sound insulation space 24, so that the sound insulation body 52 with its outer circumferential surface 56 is in contact with the circumferential wall 16 and the partition 18 in its surface areas defining the sound insulation space 24 flush and essentially without gaps.

The axial extension of the sound insulation body 52 corresponds to that of the section of the air flow tube 42 extending in the sound insulation space 24, so that the sound insulation body 52 is in contact with the inner side of the closing element 26 at the axial end facing away from the housing bottom 14, for example, flush, i.e., without gaps, and ends essentially flush with the air flow tube 42 in the end area 46 of said air flow tube 42.

A sound insulation aspect defined by absorption of sound waves is provided by the plurality of openings 50 in the air flow tube 42 and the sound insulation material of the sound insulation body 52, which said sound insulation material surrounds the air flow tube 42 in the sound insulation space 24. A sound insulation chamber 60, in which sound waves being transported in the combustion air are scattered by reflection, is formed in the end area 46 of the air flow tube 42 and of the front side 58 of the sound insulation body 52, which is flush with said air flow tube 42, in conjunction with the opposite surface of the housing bottom 14 and of the circumferential wall 16 or the partition 18, so that reflection in this volume area can make an essential contribution to sound insulation. Also contributing to this is the fact that the openings 42 and 48 in the housing bottom 14, on the one hand, and in the air flow tube 42, on the other hand, are located offset in relation to one another at least partly, i.e., they are not positioned fully overlappingly, so that a straight, direct passage of air or sound waves can be prevented from occurring in wide areas.

It is recognized especially in FIG. 7 that an actuating unit 62 for the blower motor 30 may also be carried next to the air flow tube 42 at the closing element 26 having a cover-like design. The actuating unit 62 can be electrically connected to the blower motor 30 via a line connection. For example, plug contacts, via which a plug to be led in from the outer side can be brought into line connection with the actuating unit 62, may be provided in the closing element 26. Since these are arranged, located in the motor mounting space 22, next to the blower motor 30, no additional volume areas need to be kept ready, for example, on the outer side of the circumferential wall 16, which contributes to a compact design and, furthermore, protects the actuating unit 62 from external effects.

The propagation of sound waves generated during the rotation of a feed wheel via the air being sent to the blower is prevented to a very great extent in the case of the design of a blower according to the present invention, for example, for use in a vehicle heater as a vehicle heater blower, due to the division of the blower interior space of the blower housing and the provision of a separate sound insulation space. Various insulation mechanisms, e.g., sound absorption and sound reflection, can be advantageously used and combined for this in the area of the sound insulation space. In particular, the aspect of sound insulation by reflection and the aspect of sound insulation by absorption can each be set in an optimized manner, in particular, by dimensioning different components, for example, by the suitable selection of the length of the air flow tube and also of the sound insulation body and a corresponding dimensioning of the sound insulation chamber. The openings provided in the air flow tube can also be selected for this in an optimized manner in terms of their number and their shape. For example, these could also be designed as elongated openings extending in the longitudinal direction of the air flow tube and/or as elongated openings extending in the circumferential direction.

The design of the blower is especially simple, because the blower housing with the housing bottom, with the circumferential wall and with the partition can be manufactured as an integral body, for example, as an aluminum component, according to a diecasting method. The ring-shaped feed channel provided on the outer side of the housing bottom can also be provided at the same time, and finishing may be performed to ensure the manufacturing precision necessary especially in the area of the feed channel.

While specific embodiments of the invention have been shown and described in detail to illustrate the application of the principles of the invention, it will be understood that the invention may be embodied otherwise without departing from such principles.

What is claimed is:

1. A combustion air blower for a vehicle heater, the blower comprising:
    a blower housing with a housing bottom and with a circumferential wall adjoining the housing bottom and defining a housing interior space;
    a partition dividing the housing interior space into a motor mounting space and a sound insulation space;
    a blower motor carried on an inner side of the housing bottom, the blower motor being arranged in the motor mounting space, the blower motor having a motor shaft passing through a shaft opening in the housing bottom and carrying a combustion air feed wheel located opposite an outer side of the housing bottom, wherein a ring-shaped combustion air feed channel is covered by the combustion air feed wheel and is arranged in the housing bottom on the outer side of the housing bottom, the sound insulation space being open towards the air feed channel via an air passage opening provided in the housing bottom; and
    an air flow tube extending from a closing element closing the sound insulation space at an end area of the sound insulation space, facing away from the housing bottom, into the sound insulation space, the sound insulation space being defined by the circumferential wall, the partition, the closing element and the inner side of the housing bottom, wherein an end area of the air flow tube, facing the inside of the housing bottom, is at a spaced location from the inside of the housing bottom.

2. A blower in accordance with claim 1, wherein the circumferential wall and the partition have essentially the same length of extension in a direction of a housing longitudinal axis.

3. A blower in accordance with claim 1, wherein a sound insulation chamber is formed between an end area of the air flow tube, which said end area faces the housing bottom, and the housing bottom.

4. A blower in accordance with claim 1, wherein sound insulation material surrounding the air flow tube is arranged in the sound insulation space.

5. A blower in accordance with claim 3, wherein:
    the sound insulation material fills out essentially an entire volume between an outer surface of the air flow tube and surfaces of the circumferential wall and of the partition, which surfaces face the sound insulation space; and
    an end area of the sound insulation material, which said end area faces the housing bottom, is at a spaced location from the housing bottom.

6. A blower in accordance with claim 1, wherein:
an air outlet opening is located opposite the housing bottom;
the air outlet opening is provided in an end area of the air flow tube;
said end area of the air flow tube faces the housing bottom; and
the air outlet opening and the air passage opening are located offset in relation to one another at least in some areas.

7. A blower in accordance with claim 1, wherein a plurality of openings are provided in a tube wall of the air flow tube.

8. A blower in accordance with claim 1, wherein the housing bottom is formed integrally, as a diecast metal body, with at least one of the circumferential wall and the partition.

9. A blower in accordance with claim 1, wherein said closing element closes the motor mounting space and the sound insulation space, the closing element being provided at an end area of the circumferential wall, which said end area faces away from the housing bottom.

10. A blower in accordance with claim 9, wherein the air flow tube is carried on the closing element.

11. A blower in accordance with claim 1, further comprising a motor actuating unit arranged in the motor mounting space.

12. A blower in accordance with claim 11, wherein the closing element closes the motor mounting space and the sound insulation space, the closing element being provided at an end area of the circumferential wall, which said end area faces away from the housing bottom, wherein the motor actuating unit is carried on the closing element.

13. An air blower comprising:
a blower housing with a housing bottom and with a circumferential wall adjoining the housing bottom and defining a housing interior space;
a ring-shaped combustion air feed channel;
a combustion air feed wheel;
a blower motor carried on an inner side of the housing bottom;
a partition dividing the housing interior space into a motor mounting space and a sound insulation space, the blower motor being arranged in the motor mounting space, the blower motor having a motor shaft passing through a shaft opening in the housing bottom and carrying the combustion air feed wheel located adjacent to an outer side of the housing bottom, wherein the ring-shaped combustion air feed channel is covered by the feed wheel and is arranged in the housing bottom on the outer side of the housing bottom, the sound insulation space being open towards the air feed channel via an air passage opening provided in the housing bottom; and
an air flow tube extending from a closing element closing the sound insulation space at an end area of the sound insulation space, facing away from the housing bottom, into the sound insulation space, the sound insulation space being defined by the circumferential wall, the partition, the closing element and the inner side of the housing bottom, wherein an end area of the air flow tube, facing the inside of the housing bottom, is at a spaced location from the inside of the housing bottom.

14. A blower in accordance with claim 13, wherein the circumferential wall and the partition have essentially the same length of extension in a direction of a housing longitudinal axis.

15. A blower in accordance with claim 13, wherein:
a sound insulation chamber is formed between the end area of the air flow tube, which said end area faces the housing bottom, and the housing bottom;
the sound insulation material surrounding the air flow tube is arranged in the sound insulation space;
the sound insulation material fills out essentially an entire volume between an outer surface of the air flow tube and surfaces of the circumferential wall and of the partition, which surfaces face the sound insulation space; and
an end area of the sound insulation material, which said end area faces the housing bottom, is at a spaced location from the housing bottom.

16. A blower in accordance with claim 13, wherein:
an air outlet opening is located opposite the housing bottom;
the air outlet opening is provided in an end area of the air flow tube;
said end area of the air flow tube faces the housing bottom; and
the air outlet opening and the air passage opening are located offset in relation to one another at least in some areas.

17. An air blower comprising:
a blower housing with a housing bottom and with a circumferential wall adjoining the housing bottom and defining a housing interior space;
a ring-shaped combustion air feed channel;
a combustion air feed wheel;
a blower motor carried on an inner side of the housing bottom;
a partition dividing the housing interior space into a motor mounting space and a sound insulation space, the blower motor being arranged in the motor mounting space, the blower motor having a motor shaft extending through a shaft opening in the housing bottom and carrying the combustion air feed wheel located adjacent to an outer side of the housing bottom, wherein the ring-shaped combustion air feed channel is covered by the feed wheel and the ring-shaped combustion air feed channel is arranged in the housing bottom on the outer side of the housing bottom;
an air flow tube extending from a closing element into the sound insulation space, whereby at least a portion of said air flow tube is arranged in said sound insulation body, wherein an end area of the air flow tube, facing the inner side of the housing bottom, is located at a spaced location from the housing bottom, said closing element closing the sound insulation space at an end area of the sound insulation space, facing away from the housing bottom; and
a sound insulation material, wherein one or more of said sound insulation material is arranged in said sound insulation space and said sound insulation material defines at least a portion of said sound insulation space, the sound insulation space being defined by at least the circumferential wall, the partition, the closing element and a portion of said inner side of the housing bottom.

18. A blower in accordance with claim 17, wherein a sound insulation body comprises said sound insulation material, said sound insulation body being in direct contact with said air flow tube, whereby said air flow tube is arranged in said sound insulation body, said ring-shaped combustion air feed channel, said air flow tube and said combustion air feed wheel defining at least a portion of a combustion air flow path, wherein combustion air is delivered via said combustion air flow path.

19. A blower in accordance with claim 18, wherein said air flow tube is in fluid communication with said sound insulation space.

20. A blower in accordance with claim 17, wherein said air flow tube is located at a radially spaced location from said blower motor with respect to a longitudinal axis of said blower motor.

\* \* \* \* \*